(12) United States Patent
Gjerløv et al.

(10) Patent No.: US 8,441,138 B2
(45) Date of Patent: May 14, 2013

(54) WIND TURBINE

(75) Inventors: Christian Gjerløv, Århus (DK); Jesper Graugaard, Randers (DK); Aleks Kvartborg Jakobsen, Århus (DK); Martin Jørgensen, Hovedgård (DK); Kenneth Simonsen, Hadsten (DK); Leo Thesbjerg, Ringkøbing (DK); Kasper Zinck Østergaard, Flemming (DK)

(73) Assignee: Vestas Wind Systems A/S, Aarhus N, (DK)

( * ) Notice: Subject to any disclaimer, the term of this patent is extended or adjusted under 35 U.S.C. 154(b) by 314 days.

(21) Appl. No.: 12/771,702

(22) Filed: Apr. 30, 2010

(65) Prior Publication Data

US 2010/0283245 A1    Nov. 11, 2010

Related U.S. Application Data

(60) Provisional application No. 61/176,246, filed on May 7, 2009.

(30) Foreign Application Priority Data

May 7, 2009    (DK) ................................ 2009 00593

(51) Int. Cl.
*F03D 9/00*    (2006.01)
(52) U.S. Cl.
USPC .............................................. 290/44; 290/55
(58) Field of Classification Search ............ 290/44, 290/55; 416/1; 415/1; 700/286, 288
See application file for complete search history.

(56) References Cited

U.S. PATENT DOCUMENTS

| | | | |
|---|---|---|---|
| 7,309,930 B2 * | 12/2007 | Suryanarayanan et al. | 290/55 |
| 7,603,202 B2 * | 10/2009 | Weitkamp | 700/287 |
| 7,891,944 B2 * | 2/2011 | Jeppesen et al. | 416/1 |
| 2006/0082160 A1 * | 4/2006 | Lee | 290/55 |
| 2007/0035135 A1 * | 2/2007 | Yoshida | 290/44 |
| 2008/0247873 A1 * | 10/2008 | Egedal | 416/43 |
| 2009/0206605 A1 * | 8/2009 | Schmidt | 290/44 |
| 2010/0283246 A1 * | 11/2010 | Christensen | 290/44 |
| 2011/0006526 A1 * | 1/2011 | Hemmingsson | 290/44 |
| 2011/0076142 A1 * | 3/2011 | Veldkamp et al. | 416/1 |
| 2011/0123330 A1 * | 5/2011 | Matesanz Gil | 416/1 |

FOREIGN PATENT DOCUMENTS

EP    2090775 A2    8/2009

OTHER PUBLICATIONS

Denmark Patent Office, Search Report issued in related Denmark Patent Application No. PA 2009 00593 dated Jun. 14, 2010.

* cited by examiner

*Primary Examiner* — Tulsidas C Patel
*Assistant Examiner* — Viet Nguyen
(74) *Attorney, Agent, or Firm* — Wood, Herron & Evans, LLP

(57) ABSTRACT

For optimising annual energy production in a wind turbine, the invention provides a method by which operation of the turbine in accordance with different pre-specified modes depending on the wind direction towards the turbine is enabled. The modes may include pitch and/or power control strategies. The invention further provides a control system for a wind turbine adapted to operate in accordance with the method, and a wind turbine with such a control system.

18 Claims, 3 Drawing Sheets

WIND TURBINE

CROSS-REFERENCE TO RELATED APPLICATIONS

This application claims priority under 35 U.S.C. §119(a) to DK Application No. PA 2009 00593, filed May 7, 2009. This application also claims the benefit of U.S. Provisional Application No. 61/176,246, filed May 7, 2009. Each of these applications is incorporated by reference herein in its entirety.

TECHNICAL FIELD

The present invention relates to a method of controlling a wind turbine which is erected on a specific location and which is designed for a specific nominal load, i.e., design load. The invention further relates to a control system in accordance with the method and to a wind turbine including such a control system.

BACKGROUND

A wind turbine obtains power by converting the force of the wind into torque acting on the drive train, i.e., on the rotor blades and thus on the main shaft and thereby typically on an electrical generator rotated by the main shaft directly or through a gearbox. The amount of power which the wind turbine receives and which therefore potentially can be transferred to the drive train depends on several conditions including the wind speed and the density of the air, i.e., the site conditions.

Even though a desire to increase productivity requires conversion of the highest possible amount of wind energy to electrical energy, the structural limitations of the wind turbine, i.e., the design loads, define safety limits for the allowed load on the wind turbine. In practice, the wind load depends on various weather conditions including the average wind speed, wind peaks, the density of the air, the turbulence, wind shear, and shift of wind, and the impact of the wind load on the wind turbine and thereby the load on the wind turbine can be adjusted for a current wind condition by changing various settings on the wind turbine.

Even though the loading of a wind turbine is determined by a number of weather conditions and settings on the wind turbine, the wind turbines of today are typically controlled in accordance with a relatively simple and reliable control strategy according to which the turbine is shut down completely at wind speeds above a certain safety value.

Though representing a potentially very safe way of operating a wind turbine, the complete shut down represents drawbacks, for example, due to the fact that any major change in power production may influence the supplied power grid in a negative way.

SUMMARY

Improved wind turbine control is desired for several reasons including for providing a more continuous power production even at strong winds or similar difficult weather conditions, for preventing complete power production shut down and thus for improving the performance and thus the economy of the wind turbine, and for providing a wind turbine protection which is designed for a specific wind turbine on a specific location.

The present invention, in a first aspect, provides a method of controlling a wind turbine having a rotor and a generator for producing power, the wind turbine being erected on a location and designed for a nominal load, the method comprising:

defining a plurality of sectors each specifying a range of wind directions towards the wind turbine, defining, for each sector, an expected wind load from the specified directions and a sector control strategy which is based on a predetermined comparison between the expected wind load and the nominal load; and determining a current wind direction and controlling the wind turbine in accordance with the sector control strategy defined for the sector to which the current wind direction corresponds.

A wind turbine to which the invention pertains could be erected on any location and it could be designed for any condition. Due to the fact that the site conditions are greatly influenced by the surface and geographical location on the ground, the distance and angle to nearby obstacles such as other wind turbines in a farm of wind turbines etc, the method according to the invention uses predefined sector control strategies which are applied depending on predefined sectors of wind directions towards the wind turbine. In this way, the sector control strategies, as compared to the traditional shut down control based on a fixed wind speed, may utilise long term experiences regarding wind conditions from various directions.

As a result, the wind turbine may potentially produce more power than traditional wind turbines even though the same safety limit is observed.

"Control" of the wind turbine is herein meant as any kind of setting of the turbine blades, settings on electrical generators, transformers or other electronic equipment, and in general the use of any means for controlling loading of the blades, the power train, the rotation of the power train, and/or the power production of the wind turbine.

The wind turbine to which the invention pertains could be of any commercially available kind, in particular of the kind which produces electrical energy based on rotation of an essentially horizontal main shaft, i.e., the so called "Horizontal Axis Wind Turbine", HAWT.

Each sector control strategy could be defined based on an expected wind load from wind from the corresponding sector of wind directions towards the turbine for a specific geographical location. For this purpose, the wind conditions may be monitored over a period of time at a specific desired location for a new wind turbine to be erected or for an actually erected turbine, and based on the actually experienced site conditions or loads, expected wind load may be defined for different sectors around the wind turbine location.

The expected wind load may represent an average energy content in the wind, extreme values of wind speed, average turbulence or extreme values of turbulence, frequency of wind from directions within a sector, deviation of wind speed from the average wind speed etc, and if no actually experienced data can be obtained on location, meteorological data, for example, from a nearby weather station could be used. Typically, the expected wind load will be determined before the wind turbine is erected by the use of a meteorological mast which will measure the wind conditions over a period of time.

The sectors of wind directions may, for example, represent a fixed number of degrees in a compass rose, for example, such that the 360 degrees around a location is divided into a number, for example, 2-30, of sectors of equal or different size in degrees, and for each of these sectors, a sector control strategy could be defined based on the wind loads experienced therein.

The sector control strategies may be defined based on a predetermined comparison between the expected wind load and a nominal load for which the wind turbine is designed, i.e., each of the sector control strategies may be selected based on knowledge about the expected load and the load for which the turbine has been designed.

The step of actually controlling the wind turbine by use of a sector control strategy corresponding to an actually determined wind direction may include or may be combined with additional control and safety related steps, for example, of determining power output, determining actual wind speed, determining deflection of the tower, deflection of drive train or deflection of blades etc, or measuring loads on any other critical components of the wind turbine, and any such additional step may be used in the sector control strategy to improve the safety and power efficiency of the wind turbine, or any such step may form part of additional control procedures being executed in parallel with the wind turbine control according to the present invention.

The method may comprise a given power output of the wind turbine as a function of wind speed being defined for a range of wind speeds, the given power output as a function of wind speed being the same for all sectors; and the sector control strategy for each sector controls the wind turbine such that the power output of the wind turbine is either:
  below the given power output for a given wind speed;
  equal to the given power output for a given wind speed; or
  above the given power output for a given wind speed.

By "given power output of the wind turbine as a function of wind speed" is meant the power curve of the wind turbine.

The power output of the wind turbine may be controlled by at least one power control strategy selected from a group comprising: rotor blade pitch control, rotor speed control, generator power control. The power output may be regulated, for example, by controlling the speed of the rotor, or the speed of any rotating element coupled for rotation with the rotor. The rotor speed could be controlled as a function of wind speed, for example, by controlling the resistance provided in the generator against rotation of the main shaft, or by controlling separate braking means for limiting rotation of the main shaft depending on the wind speed. Controlling the power output by controlling the rotor speed is typically done during part load operation.

According to embodiments of the present invention, the method may comprise the step of defining a plurality of pitch control strategies where each is for setting a rotor blade pitch of the wind turbine as a function of wind speed or as a function of tip speed ratio, where the tip speed ratio defines a ratio between the speed of the tip of the blades and the speed of the wind. The pitch control strategies could regulate the output power of the wind turbine as a function of wind speed by changing the blade angle relative to the hub (where each blade is rotated about its longitudinal axis), whereby the loading of the turbine is controlled.

In one example, a plurality of combinations between a wind speed and a pitch angle setting of the blades relative to the hub are predefined for two different situations.
  In one situation, the combinations provide the pitch angle for a situation where a more aggressive control with focus on power production is needed. These could represent the combinations to be selected when the current wind direction is within a sector with typical steady wind loads, for example, with low turbulence or without large deviation from an average wind speed.
  In another situation, the combinations provide the pitch angle for a situation where a less aggressive control with focus on safety rather than production is needed. The focus on safety reduces the loads acting on the wind turbine rotor and the wind turbine itself. These could represent the combinations to be selected when the current wind direction is within a sector with typical rough wind loads, for example, with high turbulence and large and/or rapid deviation from an average wind speed.

The method may also comprise the step of defining a plurality of power control strategies where each is for regulating a power output of the wind turbine as a function of wind speed thereby again controlling the loading of the turbine.

In one example, a number of predefined modes each corresponding to combinations of a power output and a rotational speed (rpm) with different loads could be defined. By use of the predefined power modes, the wind turbine can be controlled based on a choice of one of the modes depending on the sector within which a current wind direction is situated in a manner corresponding to that described already with respect to pitch modes.

It is well known that wind turbines have a rated wind speed which is the wind speed at which the rated generator power is reached. By regulating the power output above the rated wind speed, the turbine can be de-rated (to produce less than the rated power) or over-rated (to produce more than the rated power).

For this purpose, the sector control strategy for each sector may determine a power curve relating to the power output of the wind turbine as a function of wind speed. The power curve for each sector may define a part load region where the wind speed is below a rated wind speed and a full load region where the wind speed is equal to, or above the rated wind speed.

Accordingly, the wind turbine can be operated less aggressively to reduce loads and thereby power production when the turbine is in a condition which is more severe than the design conditions, and it can be operated more aggressively to increase power production and thereby loads when the turbine is in a condition which is milder than the conditions to which the turbine is designed.

The sector control strategy for each sector could be defined by:
  one of the plurality of pitch control strategies for regulating the power output of the wind turbine in the part load region.

The sector control strategy for each sector could be defined by:
  one of the plurality of power control strategies for regulating the power output of the wind turbine in the full load region.

Or, the sector control strategy for each sector could be defined by:
  one of the plurality of pitch control strategies for regulating the power output of the wind turbine during part load operation; and/or
  one of the plurality of power control strategies for regulating the power output of the wind turbine during full load operation.

In one implementation, the power output of the wind turbine in each sector is determined purely by one of either the pitch or power control strategies defined for that sector.

The expected wind load may be defined based on at least one of: an average of actually measured or calculated wind speeds, an average of actually measured or calculated turbulences, extremes of actually measured or calculated wind speed, actually measured or calculated turbulence, and frequency of wind from wind directions within each sector. Herein, frequency may be included in the defined wind load mainly to incorporate fatigue loading in the control strategy.

In accordance with the method, an expected power production from a specific wind turbine to be erected on a specific location may be determined based on the sector control strategies and expected future wind loads including expected future wind directions and wind loads. The expected power production may provide valuable forecasts of economical figures.

In a second aspect, the invention provides a control system for a wind turbine, the control system comprising a storage structure, and a control structure, wherein the storage structure contains data which defines a plurality of sectors each specifying a range of wind directions towards the wind turbine; and which defines for each sector, an expected wind load from the specified directions and a sector control strategy which is based on a predetermined comparison between the expected wind load and the nominal load, and wherein the control structure is adapted, based on a current wind direction, to control the wind turbine in accordance with the sector control strategy defined for the sector to which the current wind direction corresponds.

The control system may be adapted for performing any of the activities described relative to the first aspect of the invention.

In a third aspect, the invention provides a wind turbine, in particular a horizontal type wind turbine, which includes a control system according to the second aspect of the invention or which is controlled in whatever way in accordance with the method of the first aspect of the invention.

BRIEF DESCRIPTION OF THE DRAWINGS

Embodiments of the invention will be described in further details with reference to the drawings in which.

DETAILED DESCRIPTION

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

Figure 1:
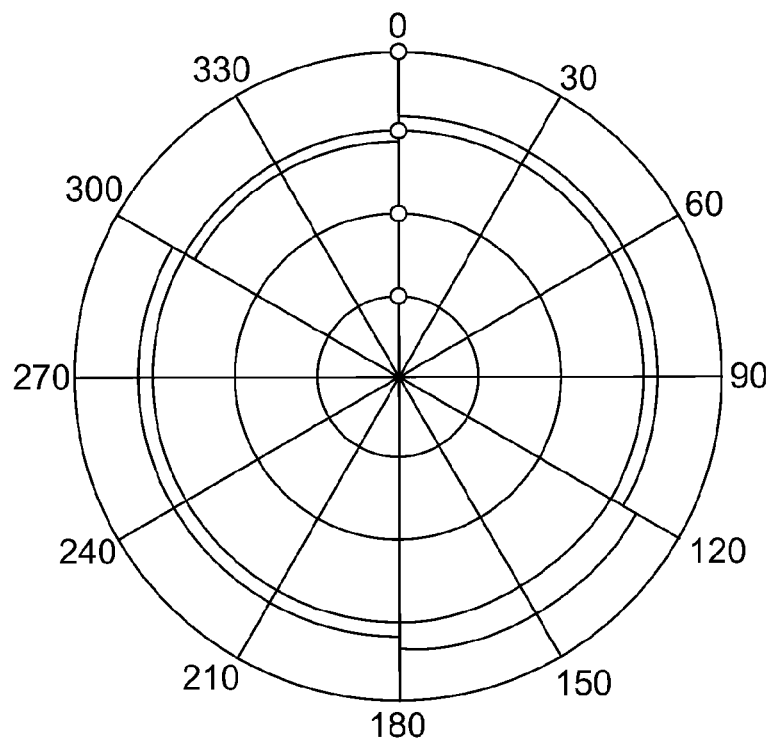
FIGS. 1 and 2 illustrate schematically definitions of different wind loads from different sectors.
Figure 2:
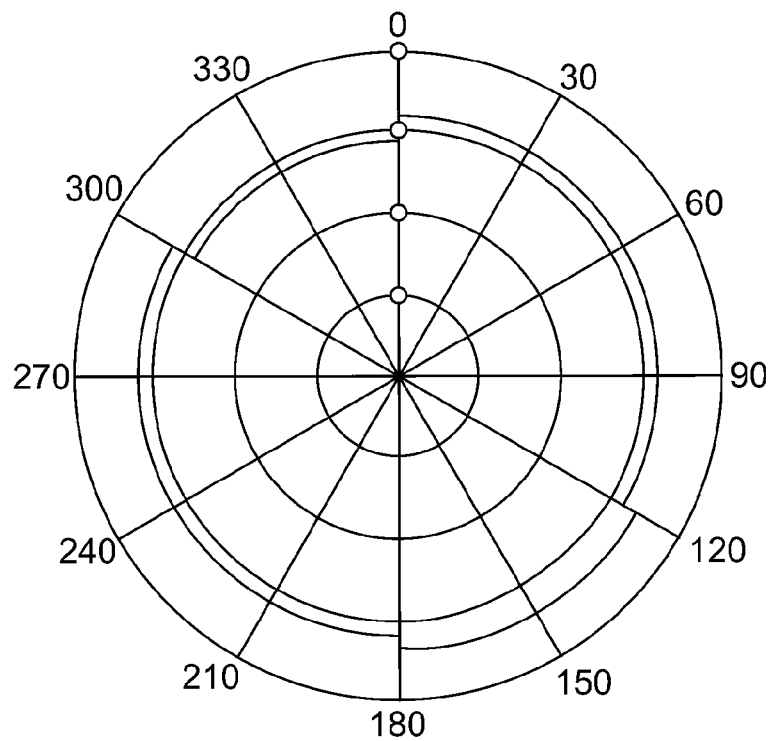

For a specific location, FIG. 1 illustrates a schematic wind rose with yearly average wind speed for 12 sectors, and FIG. 2 illustrates a schematic wind rose with turbulence intensity for the 12 sectors. The wind rose is a graphic tool which gives a schematic view of how wind speed and direction are typically distributed at a particular location. The frequencies of winds are plotted by wind direction 360 degrees around the turbine. The directions of the rose with the longest spoke show the wind direction with the greatest frequency. Twelve sectors are shown in this example, each representing 30 degrees around the compass, although any other numbers of sectors can be used.

As can be seen from FIG. 1, the average wind speed in the sectors 0 to 120 degrees and 180 to 300 degrees can be said to be the average wind speed at that particular site. In the sector 120 to 180 degrees the average wind speed is higher than average wind speed for that site. In the sector 300 to 360 degrees the wind speed is lower than average wind speed for that site.

As can be seen from FIG. 2, the average turbulence intensity in the sectors 0 to 120 degrees and 180 to 300 degrees can be said to be the average turbulence intensity at that particular site. In the sector 120 to 180 degrees the average turbulence intensity is higher than average turbulence intensity for that site. In the sector 300 to 360 degrees the turbulence intensity is lower than average turbulence intensity for that site.

The yearly average wind speed and the turbulence (both effective and extreme) intensity are the factors which determine in which mode a given turbine can operate.

Figure 3:
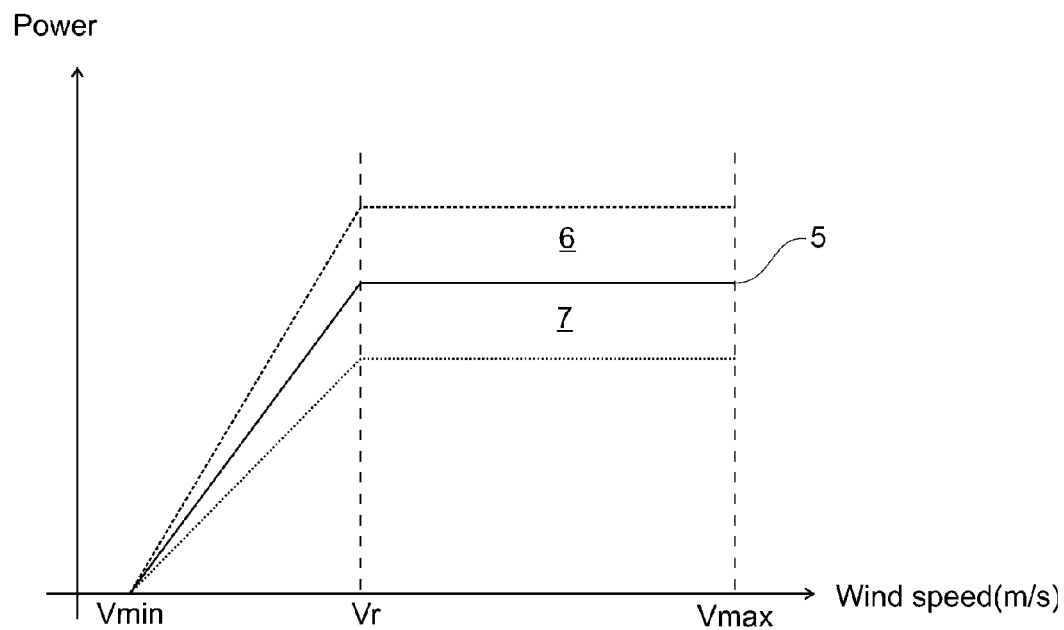
FIG. 3 illustrates how a wind turbine is controlled relative to a nominal power curve.

FIG. 3 illustrates a power curve for a wind turbine plotting wind speed on the x axis against power on the y axis. Curve 5 is the nominal power curve for the wind turbine and defines the power output by the wind turbine generator as a function of wind speed. As is well known in the art, the wind turbine starts to generate power at a cut in wind speed Vmin. The turbine then operates under part load (also known as partial load) conditions until the rated wind speed is reached at point Vr. At the rated wind speed at point Vr the rated (or nominal) generator power is reached. The cut in wind speed in a typical wind turbine is 3 m/s and the rated wind speed is 18 m/s. At point Vmax is the cut out wind speed, this is the highest wind speed at which the wind turbine may be operated while delivering power. At wind speeds equal to and above the cut out wind speed the wind turbine is shut down for safety reasons, in particular to reduce the loads acting on the wind turbine.

As mentioned above, the power curve 5 is the nominal power curve. A wind turbine is conventionally designed to withstand certain loads, such as the rotor blade root flap bending moment, the tower base bending moment and the main shaft design load. These are the "design or nominal loads" which should not be exceeded, and so the turbine has a nominal power curve, at which the turbine will be operated so that none of the defined loads are exceeded.

As shown in FIG. 3, the turbine is controlled such that it can produce more or less power than the nominal power curve in both the part load and the full load regions. The term "over-rating" is understood to mean producing more than the nominal power during full load operation. The term "de-rating" is understood to mean producing less than the nominal power during full load operation. In the invention, the turbine can produce more or less power in both the full load and the part load regions. Thus the term "over-producing" is used to refer to an increase in power production in both the part load and the full load region compared to the nominal power curve; and the term "under-producing" is used to refer to a decrease in power production in both the part load and the full load region compared to the nominal power curve. When the turbine is over-producing, the turbine is run more aggressive than normal and the generator has a power output which is higher than the nominal power for a given wind speed. The over-producing is shown in FIG. 3 as area 6. When the turbine is under-producing, the turbine is run less aggressive than normal and the turbine generator has a power output which is lower than the nominal power for a given wind speed. The under-producing is shown in FIG. 3 as area 7. It should be noted that the areas 6 and 7 extend into the part load region as well as the full load region. When the turbine is over-producing the loads acting on the turbine are increased and when the turbine is under-producing the loads acting on the turbine are decreased.

For each sector around the wind turbine, the turbine has an individual control strategy that determines the output power of the turbine. The power output of the turbine is determined based on the current wind speed and the sector towards which the wind turbine faces. Therefore, in each sector it is determined if the turbine should produce power according to the nominal power curve 5, or over-produce or under-produce. The decision of whether the turbine should produce power at its nominal level, over-produce or under-produce for each sector is programmed into the turbine when it is erected; this is based on the expected wind loads from each sector.

There are a number of ways in which the power output of the turbine can be controlled. This can include:

pitch control of the rotor blades about a pitch set point in part load and full loads operation; or speed control of the rotor about a speed set point which is controlling the rotor speed about a reference speed. For instance, in part load operation a tip speed ratio of the rotor blades is calculated. The tip speed ratio is the ratio of the speed of the tip of the blades relative to the approaching wind speed. In the part load region the power generated by the turbine can be regulated by the tip speed ratio, so if the rotor speeds up or down, the output power changes; or setting a power reference about a power set point in a converter of the wind turbine which the wind turbine can follow, and setting a pitch angle of the rotor blades; i.e. the power output can be changed dynamically by changing the power reference when there is a converter.

Figure 4:
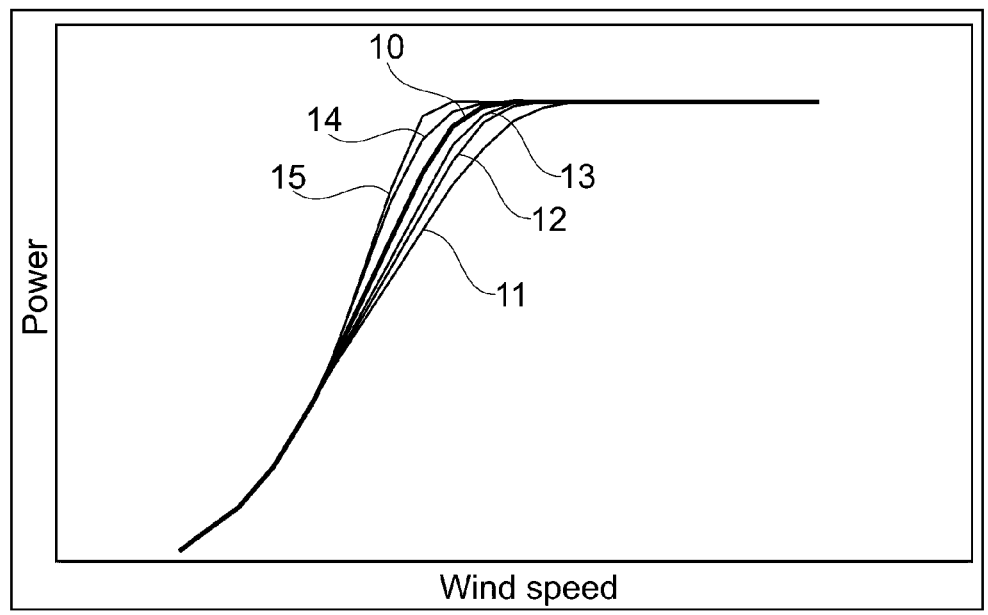
FIGS. 4 and 5 illustrate schematic power curves for pitch mode and for power mode control strategies.
Figure 5:
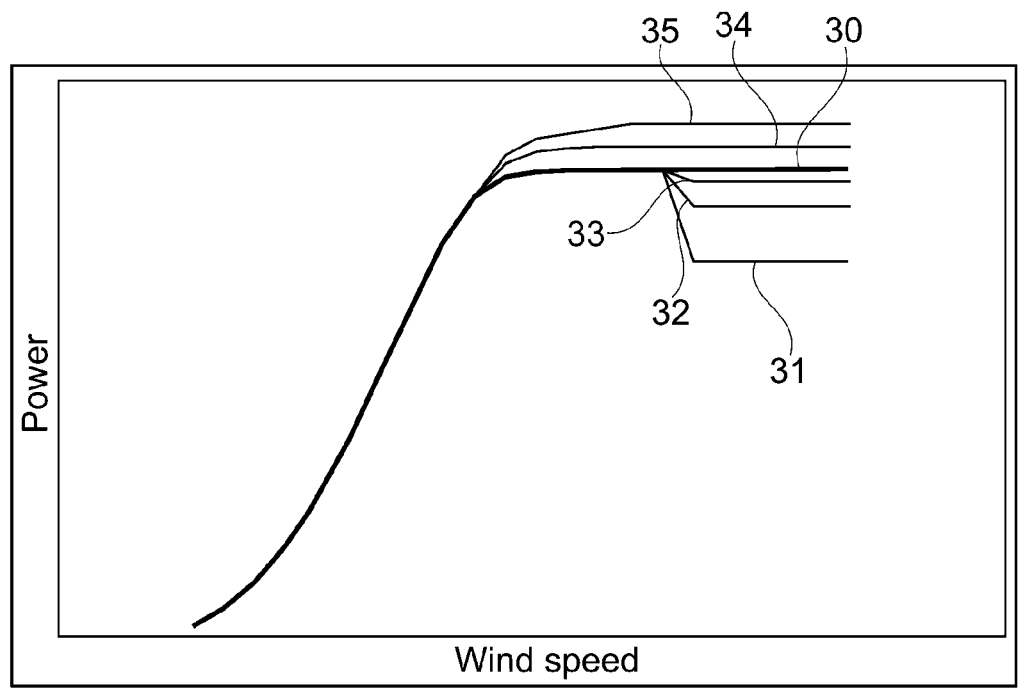

The following examples with reference to FIGS. 4 and 5 describe how the power output can be regulated with pitch and power control, although as mentioned above other ways of regulating the power output are possible.

FIG. 4 illustrates a power curve for a wind turbine plotting wind speed on the x axis against power on the y axis. Curve 10 is a power curve for a standard pitch mode of a wind turbine.

In a wind turbine having a power curve corresponding to curve 10, the power output in the part load region and the power output in the rated power (or full load) region is regulated by pitching the blades about their longitudinal axis, as is typically done in a pitch controlled or an active-stall wind turbine.

As seen in FIG. 4 the pitch modes will be used in part load operation to optimize the utilization of the design loads and thereby the power output from the turbine. In the pitch modes the parameter to be altered, in this example, is the pitch angle reference which sets the angle of the blades relative to the hub.

FIG. 4 illustrates five separate pitch modes 11 to 15 in addition to the standard pitch mode 10. Pitch modes 11, 12 and 13 are configured such that wind turbine blades are pitched so that turbine generates less power (in the part load region) compared to the standard pitch mode 10. Pitch modes 14 and 15 are configured such that the wind turbine blades are pitched so that the turbine generates more power (in the part load region) compared to the standard pitch mode 10. By pitching the blades, the aerodynamic angle of attack of the blades is changed so that the blades generate higher or lower lift. When the blades are pitched so that the lift force acting on the blades is reduced, the power output is reduced (under-producing) in comparison to the standard pitch mode 10. When the blades are pitched so that the lift force acting on the blades is increased, the power output is increased (over-producing) in comparison to the standard pitch mode 10.

Accordingly, as can be seen from FIG. 4 there is a "pool" of six pitch modes which the wind turbine can operate under. However, other numbers of pitch modes may be chosen, such as ten pitch modes.

From FIG. 5, it can be seen that the power modes will be used in full load operation, again to optimize the utilization of the design loads and thereby the power output from the turbine. In the power modes the parameters to be altered are the so called power reference and the rpm reference.

FIG. 5 illustrates a standard power mode 30. The standard power mode 30 corresponds to the rated (or nominal) power of the wind turbine, i.e., the power generated at the rated wind speed. Power modes 31, 32 and 33 are configured so that the wind turbine generates less than the rated power defined by the standard power mode 30, i.e., the turbine is de-rated. Power modes 34 and 35 are configured so that the wind turbine generates more than the rated power defined by the standard power mode 30, i.e., the turbine is over-rated.

Accordingly, as can be seen from FIG. 5 there are a "pool" of six power modes which the wind turbine can operate under. However, other numbers of power modes may be chosen, such as ten power modes.

FIGS. 4 and 5 have been described with reference to "pitch modes" and "power modes". However, they could also have been described with reference to "load operation modes" and "power operation modes". Here a load operation mode is when the turbine operates according to a power curve below the standard power curve 10, 30, i.e., in the area 7 in FIG. 3. For example, the power curves 11, 12, 13, 31, 32, 33 are load operation modes. When the turbine operates according to a load operation mode, the power generated by the turbine and the loads acting on the turbine are reduced in comparison to when the turbine is operating at the standard power curve 10, 30. A power operation mode is when the turbine operates according to a power curve above the standard power curve 10, 30, i.e., in the area 7 in FIG. 3. For example, the power curves 14, 15, 34, 35 are power operation modes. When the turbine operates according to a power operation mode, the power generated by the turbine and the loads acting on the turbine are increased in comparison to when the turbine is operating at the standard power curve 10, 30. Accordingly, although the terms pitch mode and power mode are used in describing this example, the skilled person will recognise that the terms load operation mode and power operation mode could equally be used.

Referring again to FIGS. 1 and 2, when choosing which particular model of wind turbine should be erected at this specific location, the conventional method of the prior art is as follows: each turbine model is designed for given loads and it is necessary to only place turbines in a site when they can cope with the loads that arise from that site—in other words, the loads acting on the wind turbine must be within the design loads. The wind rose is studied from which the maximum expected loads that the wind turbine will be subjected to are calculated from knowledge of the wind speed and the turbulence intensity. Then the particular turbine model is chosen which can withstand with the maximum loads determined from the wind rose. Alternatively, the turbine may be shut down regularly in certain sectors when the wind speed is above the cut out wind speed.

However, in this example according to the invention, a particular model of turbine is designed to be subjected to certain maximum loads—the "design loads". For the turbine given in this example the site loads (the loads acting on the wind turbine at the actual site) are slightly below the design loads in the sectors 0 to 120 degrees and 180 to 300 degrees. In the sector 120 to 180 degrees, the site loads are well above design loads and in sector 300 to 360 degrees, the site loads are well below design loads.

Without the pitch and power modes available the turbine in question would operate in a standard mode (according to pitch mode 10 and power mode 30) in sectors 0 to 120 degrees and 180 to 360 degrees and therefore not utilise the full design loads of the turbine. In the sector 120 to 180 degrees, the turbine will be shut down so as not to exceed the design loads of the turbine. Of course, this would have caused an unnecessary production loss.

With pitch and power modes available in this example of the invention it is possible for the turbine to operate in the following modes without exceeding the design loads:

In the sectors 0 to 120 degrees and 180 to 300 degrees, the turbine can operate in pitch mode 15 with increased loads and power output in part load. The reason for this is that the site loads are slightly below the loads for which the turbine is designed.

In sector 300 to 360 degrees, the turbine can operate in pitch mode 15 and power mode 34 (increasing loads and power both in part and full load) since the site loads are well below design loads.

In sector 120 to 180 degrees, the turbine can operate in pitch mode 12 in part load and power mode 31 above the rated wind speed, i.e. with reduced loads and power both in part and full load) since the site loads are well above the design loads.

For each sector around the wind turbine, a sector control strategy is defined. The sector control strategy relates to one of the pitch modes and one of the power modes. The sector control strategy for each sector is predetermined before the wind turbine is put into operation. To choose the correct sector control strategy for each sector, a comparison is carried out between the expected wind load in that particular sector and the design loads of the turbine. The design load of the turbine can also be referred to as the nominal load.

The pitch and power modes can be used either (i) to run the wind turbine more aggressively to increase the power production, and consequently the loads acting on the turbine when the turbine is facing a sector with average site loads that are milder than the design loads of the turbine; or (ii) to run the turbine less aggressively when the turbine is facing a sector with average site loads which are more severe than the design loads for the turbine.

Accordingly, a wind turbine implementing the pitch and power modes of the invention can be erected at a location where it would not be possible to site the same wind turbine which does not have the pitch and power modes. This is because in the sectors with a high expected wind load, the wind turbine under-produces power so that the loads acting on the wind turbine are reduced. Furthermore, the wind turbine can over-produce when facing sectors with a low expected wind load.

Consequently, the use of pitch and power modes is advantageous not just because a turbine can be erected in locations for which it is not normally designed, but also because it can generate power for more of the time, i.e., it is not necessary to shut down the turbine.

Figure 6:
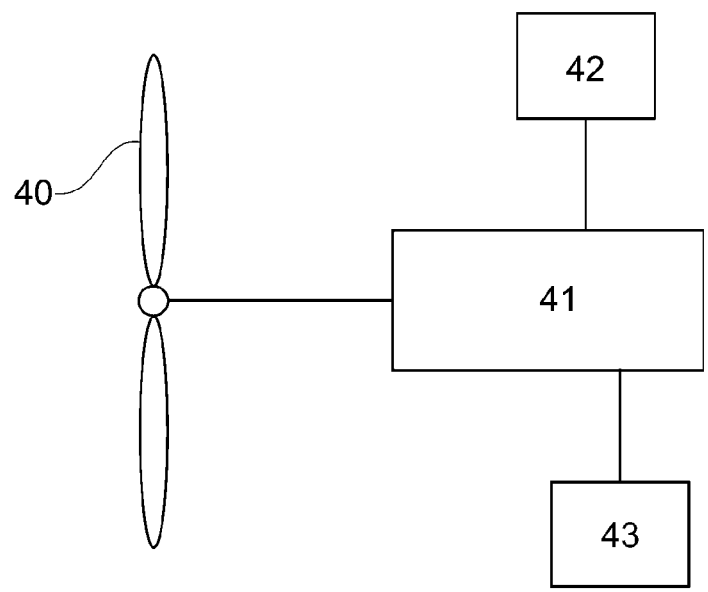
FIG. 6 illustrates a diagram of a wind turbine controller.

FIG. 6 illustrates a schematic view of a wind turbine controller. A rotor is controlled by a controller 41. The controller 41 receives inputs from a direction monitoring means 42 and a wind speed measurement means 43. The direction monitoring means 42 determines in which sector the wind turbine is facing, and this can be measured by knowledge of the wind direction (as the rotor will always face into the oncoming wind) or by measuring the rotation of the nacelle (on which the hub is mounted) relative to the wind turbine tower (which supports the nacelle). The wind speed measurement means 43 is, in this example, an anemometer.

The controller 41 has within it a data storage means for storing data about the pitch and power modes. This can be in the form of a look up table. A look up table is provided for each of the six pitch modes and will contain data specifying at what angles the blades should be pitched for a range of wind speeds up to the rated wind speed. A look up table is also provided for each of the six power modes and contains data for how the power output of the wind turbine is regulated above the rated wind speed.

The controller is pre-programmed such that it knows what pitch and power mode is to be used for each sector. In the example given here six pitch and six power modes are shown, but only pitch modes 12 and 15 and power modes 31 and 34 are used as described above. Accordingly, one pitch mode and one power mode is designated for each sector.

In use, the controller 41 receives information about what sector the wind rotor is facing and what the wind speed is. If the wind speed is below the rated wind speed, the controller 41 will set the rotor to operate at the particular pitch mode designated for that sector, and further, the controller 41 will consult the look up table for that pitch mode sector to determine what the pitch angle for the blades should be as a function of the wind speed. If the wind speed is above the rated wind speed, the controller 41 will set the wind turbine to operate at the particular power mode designated for that sector.

The controller 41 may also monitor the current wind speed from an anemometer and implement the pitch mode or the power mode in dependence on the measured wind speed. Thus, as can be seen for example in FIG. 6, the power modes 31, 32, 33 are only implemented above a predefined wind speed.

In addition, the controller 41 can be programmed to a particular cut in wind speed and a particular cut out wind speed for each sector. This means that if a given site has very high turbulence in low wind speeds in one or more sectors the cut in wind speed could be specified to be 6 m/s rather than 3 m/s to avoid the turbine operating in highly turbulent wind. Similarly, if a given site has very low turbulence in high wind speeds in certain sectors, the cut out wind speed could be specified to be e.g. 27 m/s instead of 25 m/s to utilize high wind production without over loading the turbine.

Furthermore, the controller 41 can be programmed such that control strategies are defined for a particular time of day, or a particular time of year. For example, at night time or in the winter, the expected wind loads are higher than in the day time or the summer respectively, due to atmospheric conditions such as air density. Therefore, for a given sector, a different control strategy may be defined for different time periods.

What is claimed is:

1. A method of controlling a wind turbine having a rotor and a generator for producing power, the wind turbine being erected on a location and designed for a nominal load, the method comprising:

defining a plurality of sectors each specifying a range of wind directions towards the wind turbine, defining, for each sector, an expected wind load from the specified directions and a sector control strategy which is based on a predetermined comparison between the expected wind load and the nominal load; and determining a current wind direction and controlling the wind turbine in accordance with the sector control strategy defined for the sector to which the current wind direction corresponds.

2. The method according to claim 1, wherein each sector control strategy is defined based on an expected wind load from wind from the corresponding sector of wind directions towards the turbine for a specific geographical location.

3. The method according to claim 1, wherein a given power output of the wind turbine as a function of wind speed is defined for a range of wind speeds, the given power output as a function of wind speed being the same for all sectors; and the sector control strategy for each sector controls the wind turbine such that the power output of the wind turbine is either:
  below the given power output for a given wind speed;
  equal to the given power output for a given wind speed; or
  above the given power output for a given wind speed.

4. The method according to claim 3, wherein the power output of the wind turbine is controlled by at least one power control strategy selected from a group comprising: rotor blade pitch control, rotor speed control, generator power control.

5. The method according to claim 1, further comprising defining a plurality of pitch control strategies, each pitch control strategy for setting a rotor blade pitch of the wind turbine as a function of wind speed in order to regulate the output power of the wind turbine as a function of wind speed.

6. The method according to claim 1, further comprising defining a plurality of power control strategies, each power control strategy for regulating a power output of the wind turbine as a function of wind speed.

7. The method according to claim 6, wherein the power output is regulated by controlling a rotor speed of the wind turbine as a function of wind speed.

8. The method according to claim 1, wherein the sector control strategy for each sector determines a power curve relating to the power output of the wind turbine as a function of wind speed, the power curve for each sector having:
  a part load region where the wind speed is below a rated wind speed; and
  a full load region where the wind speed is equal to, or above the rated wind speed.

9. The method according to claim 8, wherein the sector control strategy for each sector is defined by:
  one of the plurality of pitch control strategies for regulating the power output of the wind turbine in the part load region.

10. The method according to claim 8, wherein the sector control strategy for each sector is defined by:
  one of the plurality of power control strategies for regulating the power output of the wind turbine in the full load region.

11. The method according to claim 8, wherein the sector control strategy for each sector is defined by at least one of:
  one of the plurality of pitch control strategies for regulating the power output of the wind turbine in the part load region; and
  one of the plurality of power control strategies for regulating the power output of the wind turbine in the full load region.

12. The method according to claim 11, wherein the power output of the wind turbine in each sector is determined by at least one of:
  the pitch control strategy for that sector; and
  the power control strategy for that sector.

13. The method according to claim 1, wherein the expected wind load is defined based on at least one of: an average of actually measured or calculated wind speeds, an average of actually measured or calculated turbulences, extremes of actually measured or calculated wind speed, actually measured or calculated turbulence, and frequency of wind from wind directions within each sector.

14. The method according to claim 1, wherein the sector control strategy for each sector has a predetermined cut in wind speed above which the wind turbine generator starts to output power and a predetermined cut out wind speed above which the wind turbine generator stops outputting power; the predetermined cut in wind speed and the predetermined cut out wind speed for each sector being based on the predetermined comparison between the expected wind load and the nominal load.

15. The method according to claim 1, wherein the sector control strategy for each sector controls the wind turbine according to a temporal strategy, such that the wind turbine is controlled in accordance with the time of day and/or the time of year.

16. A control system for a wind turbine, the control system comprising a storage structure, and a control structure, wherein the storage structure contains data which defines a plurality of sectors each specifying a range of wind directions towards the wind turbine; and which defines for each sector, an expected wind load from the specified directions and a sector control strategy which is based on a predetermined comparison between the expected wind load and the nominal load, and wherein the control structure is adapted, based on a current wind direction, to control the wind turbine in accordance with the sector control strategy defined for the sector to which the current wind direction corresponds.

17. The control system according to claim 16, wherein the control system is adapted to carry out the method according to claim 1.

18. A wind turbine for converting between wind energy and electrical energy, the wind turbine comprising a control system according to claim 16.

* * * * *